Jan. 9, 1968     E. G. KESHOCK     3,362,777

BUTTER APPLICATOR

Filed Sept. 15, 1964

INVENTOR.
EDWARD G. KESHOCK
BY Watts + Fisher

ATTORNEYS

3,362,777
BUTTER APPLICATOR
Edward G. Keshock, 259 Vivian Drive,
Berea, Ohio 44017
Filed Sept. 15, 1964, Ser. No. 396,625
8 Claims. (Cl. 401—12)

ABSTRACT OF THE DISCLOSURE

A butter applicator composed of a highly heat conductive material has an opening along its length for the passage of butter therethrough and a pair of applicator portions extending laterally from the opening for applying butter to an ear of corn.

---

The present invention relates to improvements in a device for spreading butter on corn-on-the-cob.

Previously a number of proposals have been made for mechanisms for applying butter to corn-on-the-cob.

These prior proposals have had a number of disadvantages. Most insulate the butter from the corn and inhibit proper and prompt melting and, therefore, application of the butter. Others allow the butter to directly contact the corn and, therefore, while facilitating the flow of butter do not, after a little use, properly retain the heat softened butter.

Many prior proposals for butter spreaders have perforated bottoms through which butter passes before coming in contact with the surface of an ear of corn. With this arrangement it is difficult to fully cover an ear of corn with butter in a short period of time. This is true both because the bottom tends to heat insulate the butter and it inhibits free flow of the butter.

The time factor can be particularly significant with larger families where each member of the family wants to butter an ear of corn at the same time. To avoid confusion at the dinner table, a housewife would desire a device which takes care of the buttering operation in a matter of a few seconds.

Accordingly, one of the primary objects of the present invention is to provide a device for buttering corn as quickly and conveniently as possible.

Another primary object is to provide a device which uniformly applies butter to corn without waste and without the attendant dripping or soiling which has often in the past been a problem.

According to the present invention, a sheet of metal is folded on itself to provide an elongated tube of square cross section. The tube is sized to receive a section of a standard one-fourth pound stick of butter. End caps snap into the ends of the tube to retain the butter section therein. The ends of the sheet of metal flare outwardly and are arcuately curved to provide two corn contacting applicator surfaces and to define therebetween an elongated applicator slit.

Heat from the corn to be buttered warms portions of the metal applicators and then the walls of the tube. This melts the surface of the butter section and the melted butter then feeds along the metal, through the slit, and thence out the applicator portion and onto the corn.

Other objects and a fuller understanding of the invention may be had by referring to the following description and claims taken in conjunction with the accompanying drawings, wherein:

Figures 1, 2, 3:
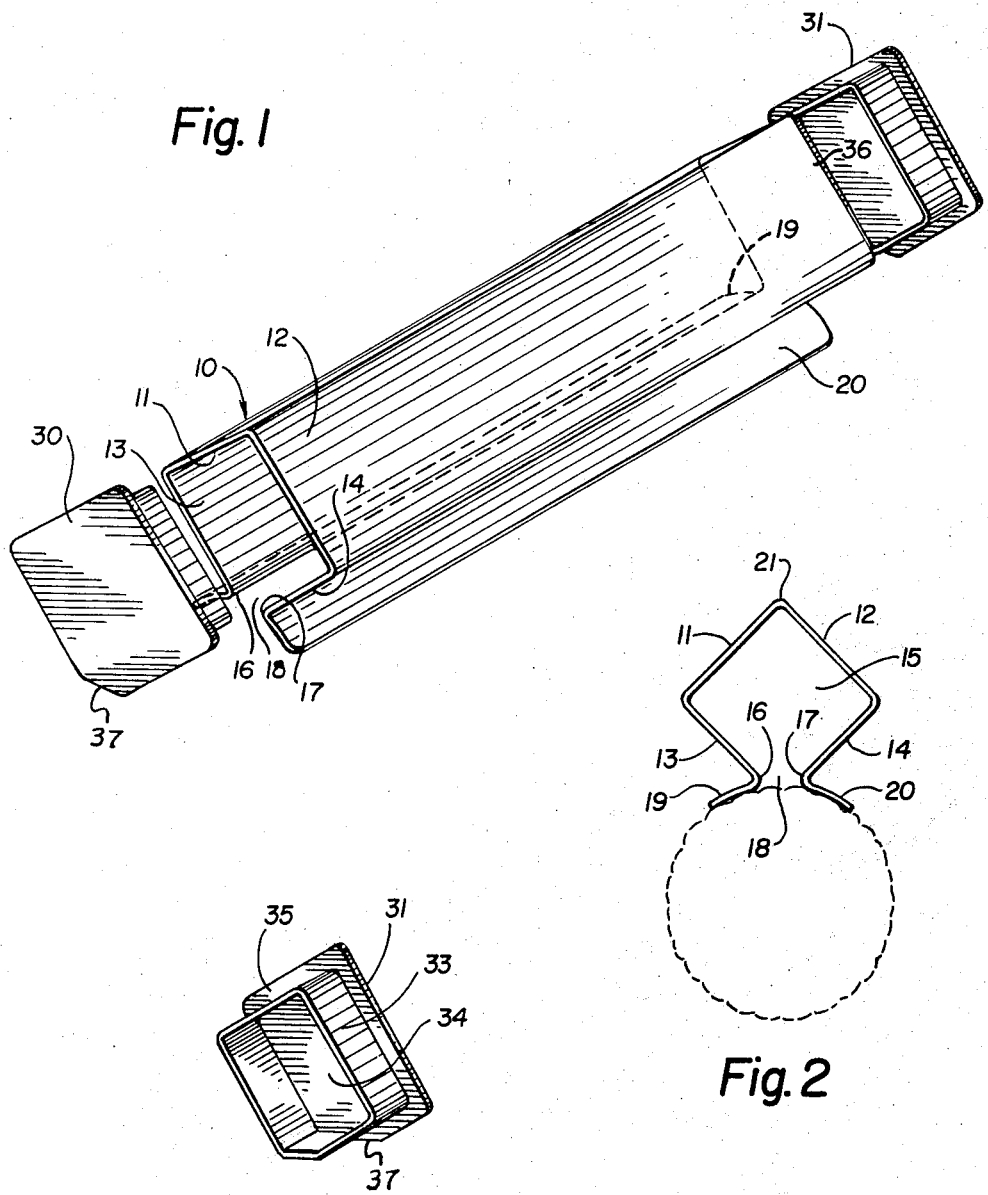
FIGURE 1 is an exploded perspective view of the improved spreader and end caps.
FIGURE 2 is an end elevational view of the spreader.
FIGURE 3 is an enlarged perspective view of an end cap.

In the drawing a receptacle body is shown generally at 10. The body is of a transverse dimension large enough to receive a section of a standard one-fourth pound stick of butter. The body 10 may be as long as a standard quarter pound stick but is preferably somewhat shorter. The receptacle body 10 is formed of a sheet of metal folded on itself to provide four rectangular walls 11, 12, 13, 14. These walls 11–14 define a square butter receiving space 15.

The lower rectangular walls 13, 14 have spaced lower longitudinal edges 16, 17. The edges 16, 17 are parallel to one another and define an opening 18 through which butter is discharged. A pair of arcuate applicator portions 19, 20 flare out in opposite directions and are adapted to substantially match the curvature of an ear of corn.

In operation, a stick of butter is deposited in the space 15. A corner portion of the butter stick will project through the opening 18 for direct application to an ear of corn but the primary butter flow will be from butter contacting the lower walls 13, 14 when they become warm.

When butter is applied, the device is grasped by the receptacle body 10, which functions as a handle. If desired, a separate handle may be supplied. The device is then placed over an ear of corn, the arcuate walls 19, 20 engaging with the kernels. The ear of corn is then rotated in applying butter and the device may be run back and forth along the ear's length for full coverage.

The device works especially well if the body 10 is composed of aluminum having a high coefficient of thermal conductivity. When a hot ear of corn makes contact with portions of the arcuate walls 19, 20, heat is transferred to the walls 13, 14 melting some of the butter disposed in the space 15. The butter is then discharged through opening 18, coating portions of the arcuate applicator portions 19, 20 adjacent the opening or slit 18. Butter flowing through the slit and out the applicator portions is transferred to the corn as the applicator is moved along the surface of the ear. Since the body 10 is composed of aluminum, heat is rapidly dissipated from the device after contact with the hot ear of corn and the melting of the butter is curtailed while the device is not in use.

A pair of end caps 30, 31 are provided which close the ends of the space 15. The caps are identical and for simplicity only the cap 31, shown on an enlarged scale in FIGURE 3, will be described in detail. The cap 31 has an inwardly extending projection 33. The projection 33 is preferably endless and substantially square in transverse configuration to telescope tightly into an end of the body 10 and permit a central portion 33 of the cap to close the end of the space. A lip portion 35 substantially surrounds the projection 33 to abut end 36 of the body 10 to position the cap longitudinally of the space 15. Preferably the lip 35 overlies the body 10 to facilitate removal of the cap. A corner of the lip 35 is omitted at 37 so that the cap will not strike the ear of corn.

Although the invention has been described in its preferred form with a certain degree of particularity, it is understood that the present disclosure of the preferred form has been made only by way of example and that numerous changes can be made in the details of construction without departing from the spirit and scope of the invention.

What is claimed is:
1. A device for applying butter to an ear of corn comprising:
 (a) an elongated receptacle body having a space for holding a quantity of butter, the receptacle body having an opening along the length of the receptacle body whereby butter is discharged;

(b) said body including first and second elongated lower wall portions converging toward one another and defining said opening;
(c) said body having concavely curved applicator portions extending laterally outwardly from the opening; and,
(d) said body and said applicator portions composed of metal having sufficiently high thermal conductivity to melt butter in said body through transfer of heat from corn being buttered.

2. A device for applying butter to an ear of corn comprising:
(a) a tubular, receptacle body having open ends and defining a space, the receptacle body having at least two spaced rectangular lower wall portions, the wall portions converging toward one another and defining an opening therebetween longitudinally of the receptacle body through which butter is discharged;
(b) the body having two concavely curved applicator portions, each extending laterally outwardly from the opening; and,
(c) said body and said applicator portions composed of metal having sufficiently high thermal conductivity to melt butter in said body through transfer of heat from corn being buttered.

3. The device of claim 2 wherein the space is substantially square in cross section.

4. The device of claim 2 wherein end caps are telescoped into the ends of the body to close the ends of said space.

5. An applicator for applying butter or the like to an ear of corn comprising:
(a) an aluminum sheet folded on itself to provide wall portions defining an open ended, tubular, body of square cross section;
(b) said body having an elongated, butter dispensing slit extending along one longitudinal corner of said square space;
(c) first and second end portions of said sheet extending laterally outwardly from said slit to define applicator portions; and,
(d) a pair of end caps connected to the body and closing the ends of said tubular space.

6. The device of claim 5 wherein the end caps each comprise:
(a) a portion in telescopic relationship with the body and frictionally engaging the wall portions; and,
(b) a lip portion overlying the ends of said wall portions to facilitate cap removal.

7. An applicator for applying butter or the like to an ear of corn comprising:
(a) an aluminum sheet folded on itself to provide wall portions defining an open ended, tubular, body of square cross section;
(b) said body having an elongated, butter dispensing slit extending along one longitudinal corner of said square space;
(c) first and second end portions of said sheet extending laterally outwardly from said slit to define applicator portions; and,
(d) means at least partially closing the ends of the tubular body to maintain a quantity of butter therein.

8. A butter applicator for corn on the cob comprising:
(a) a body defining an elongated butter receiving space adapted to receive a portion of stick butter;
(b) said body including first and second elongated lower wall portions defining a longitudinally extending butter dispensing slit therebetween;
(c) said body including third and fourth elongated upper wall portions connected to said lower portions and defining the top of said butter receiving space whereby to maintain a portion of stick butter therein;
(d) said body including first and second applicator portions extending longitudinally near said slit and respectively connected to the first and second elongated wall portions;
(e) said applicator portions extending laterally outwardly from said slit and being curved in a plane transverse to said slit;
(f) said applicator portions and wall portions being relatively thin and of a highly heat conductive material whereby to conduct heat from the corn to the butter to melt the latter; and,
(g) end means closing at least a portion of the ends of said butter receiving space.

References Cited

UNITED STATES PATENTS

| | | | |
|---|---|---|---|
| D. 194,883 | 3/1963 | Mattar et al. | 15—514 X |
| 2,058,128 | 10/1936 | Brubach | 118—503 X |
| 2,811,844 | 11/1957 | Selmer | 118—13 |
| 2,948,260 | 8/1960 | Lubore | 118—13 |

CHARLES A. WILLMUTH, *Primary Examiner.*

J. P. McINTOSH, *Assistant Examiner.*